(12) United States Patent
Wu

(10) Patent No.: US 8,758,928 B2
(45) Date of Patent: *Jun. 24, 2014

(54) CONDUCTIVE STRUCTURE FOR AN ELECTRODE ASSEMBLY OF A LITHIUM SECONDARY BATTERY

(76) Inventor: Donald P. H. Wu, Hsinchu County (TW)

( * ) Notice: Subject to any disclaimer, the term of this patent is extended or adjusted under 35 U.S.C. 154(b) by 2132 days.

This patent is subject to a terminal disclaimer.

(21) Appl. No.: 11/456,119

(22) Filed: Jul. 7, 2006

(65) Prior Publication Data

US 2008/0008934 A1    Jan. 10, 2008

(51) Int. Cl.
 *H01M 2/20* (2006.01)
 *H01M 2/26* (2006.01)

(52) U.S. Cl.
 CPC ..................... *H01M 2/263* (2013.01)
 USPC ........................................................ 429/161

(58) Field of Classification Search
 CPC ............................... H01M 2/26; H01M 2/263
 USPC .......................................................... 429/161
 See application file for complete search history.

(56) References Cited

U.S. PATENT DOCUMENTS

| 2,025,452 | A | * | 12/1935 | Hjelmblad | 429/161 |
| 5,849,431 | A | * | 12/1998 | Kita et al. | 429/164 |
| 2005/0153200 | A1 | * | 7/2005 | Wiepen | 429/160 |
| 2006/0110658 | A1 | * | 5/2006 | Zhu et al. | 429/208 |

FOREIGN PATENT DOCUMENTS

JP           2001-257002      *  9/2001     ............ H01M 10/40

OTHER PUBLICATIONS

Machine translation of JP2001-257002 A.*

* cited by examiner

*Primary Examiner* — Maria J Laios

(57) ABSTRACT

An electrode assembly of a lithium secondary battery is specially designed such that the positive and negative layers are formed at a side thereof with a large uncoated negative lead area and a large uncoated positive lead area. In addition, the collecting area is located correspondingly to the negative lead area or the positive lead area. And then the clasping assemblies are fixed outside the positive lead area or the negative lead area. In this way, the two pressing pieces are firmly pressed against the positive lead area or the negative lead area. On the one hand, the respective layers of the positive lead area or the negative lead area are pressed closely against one another, and on the other hand, the innermost layer of the positive lead area or the negative lead area is allowed to be maintained in a tight electrical contact with the collecting area.

1 Claim, 9 Drawing Sheets

CONDUCTIVE STRUCTURE FOR AN ELECTRODE ASSEMBLY OF A LITHIUM SECONDARY BATTERY

BACKGROUND OF THE INVENTION

1. Field of the Invention

The present invention relates to a conductive structure for an electrode assembly of a lithium secondary battery, and more particularly to an electric power collecting and leading structure for an electrode assembly of a lithium secondary battery.

2. Description of the Prior Art

Referring to FIGS. 1 and 2, a spirally coiled electrode assembly 10 of a conventional lithium secondary battery disclosed by U.S. Pat. No. 5,849,431 comprises a web-like positive layer 11, a negative layer 12 and a separator layer 13 that are sequentially laminated to one another and are then wind about a core 14. One side of the positive layer 11 and the negative layer 12 are cut into rectangular teeth that serve as rectangular leads 111 and 131. The rectangular leads 111 and 131 are gathered together and then welded to the outer periphery of the disc-like conductive terminal 15. By such arrangements, the electric power can be outputted out of the electrode assembly 10.

It is to be noted that the respective layers of the electrode assembly are arranged in a concentric manner, and the respective leads are located at different distances to the outer periphery of the conductive terminal. Before welding the respective leads to the conductive terminal, the respective leads must be trimmed and tidied up and then welded to the outer periphery of the conductive terminal.

However, this conventional battery structure still has the following disadvantages:

Firstly, when manufacturing the electrode assembly, it must be careful to avoid the complicated cutting and trimming operation, since the trimming operation will produce bits of waste. If the bits of waste are adhered to the surface of the positive and negative electrode layers, it will lead to an unrecoverable conduction disturbance of the electrode assembly. And in this conventional lithium secondary battery structure, the electrode assembly should be subjected to the teeth cutting operation, this will not only increase the manufacturing difficulties, reducing the acceptance ratio of the products, but will produce bits of waste.

Secondly, the leads of the respective layers of the electrode assembly are arranged in a concentric manner, and the leads must be equal in length, and the length of the lead that is located far away from the outer periphery of the conductive terminal is regarded as a reference value. Therefore, the excessively long leads must be subjected to a tiding up operation in which the excessively long leads are pressed together. However, this tidying up operation will not only increase the complexity of the manufacturing process, but will have the risk of breaking the leads.

Thirdly, the area of the outer periphery of the disc-like conductive terminal to be welded with the leads are very small, if there are too many leads, the battery manufacturing process will become more complicated and difficult.

Referring to FIG. 3, a conventional lithium secondary battery disclosed by U.S. Pat. No. 6,447,946 is illustrated and comprises a plurality of leads 111a and 131a welded to the end periphery of the electrode assembly 10a, and then the leads 111a and 131a are welded to a frame 161 disposed at a side of the battery terminal 16.

The electrode assemblies in the two abovementioned conventional lithium battery structures are all formed or welded with a plurality of leads, and then the leads serve as a medium to which the battery terminal or the conductive terminal, so as to guide the electric power of the electrode assembly out of the battery. It is to be noted that, for a high capacity battery, the number of leads must be relatively increased as compared to a battery of ordinary capacity. Otherwise, in the battery charge or discharge process, the increase of internal resistance will lead to a substantial decrease in the charge and discharge efficiency, or even worse, a failure of battery charge and discharge. However, as for the conventional structure, the number of the leads is difficult to effectively increase since it is limited by the welding and cutting technology.

It is understood from the above description that the battery with a comparatively great number of leads can effectively reduce the internal resistance and reactance of the battery while improving the capacity thereof. However, for such a great number of leads, the welding operation is not only laborsome, but the manufacturing process is complex.

Therefore, the present invention is emphasized on designing such a battery structure whose electrode assembly is in direct electrical contact with the battery terminal without the use of welding operation. On the other hand, via structural design, the electrode assembly is allowed to be in a large area of electrical contact with the battery terminal. In this way, the internal resistance of the battery is substantially reduced while the capacity is improved.

The present invention has arisen to mitigate and/or obviate the afore-described disadvantages.

SUMMARY OF THE INVENTION

The primary objective of the present invention is to provide a conductive structure for an electrode assembly of a lithium secondary battery. The positive and negative layers of the electrode assembly are formed at a side thereof with a large uncoated negative lead area and a large uncoated positive lead area. The lead terminal is formed at its mid portion with a large collecting area. A clasping assembly enables the positive and negative lead areas to keep in electrical contact with the collecting area, and makes the respective layers of the positive and negative lead areas press against one another closely. In this way, the electrode assembly is allowed to be in a large area of electrical contact with the battery terminal, so that the internal resistance can be effectively reduced, and meanwhile, the secondary battery has an excellent capability to charge and discharge large currents.

DETAILED DESCRIPTION OF THE PREFERRED EMBODIMENTS

Figure 1:
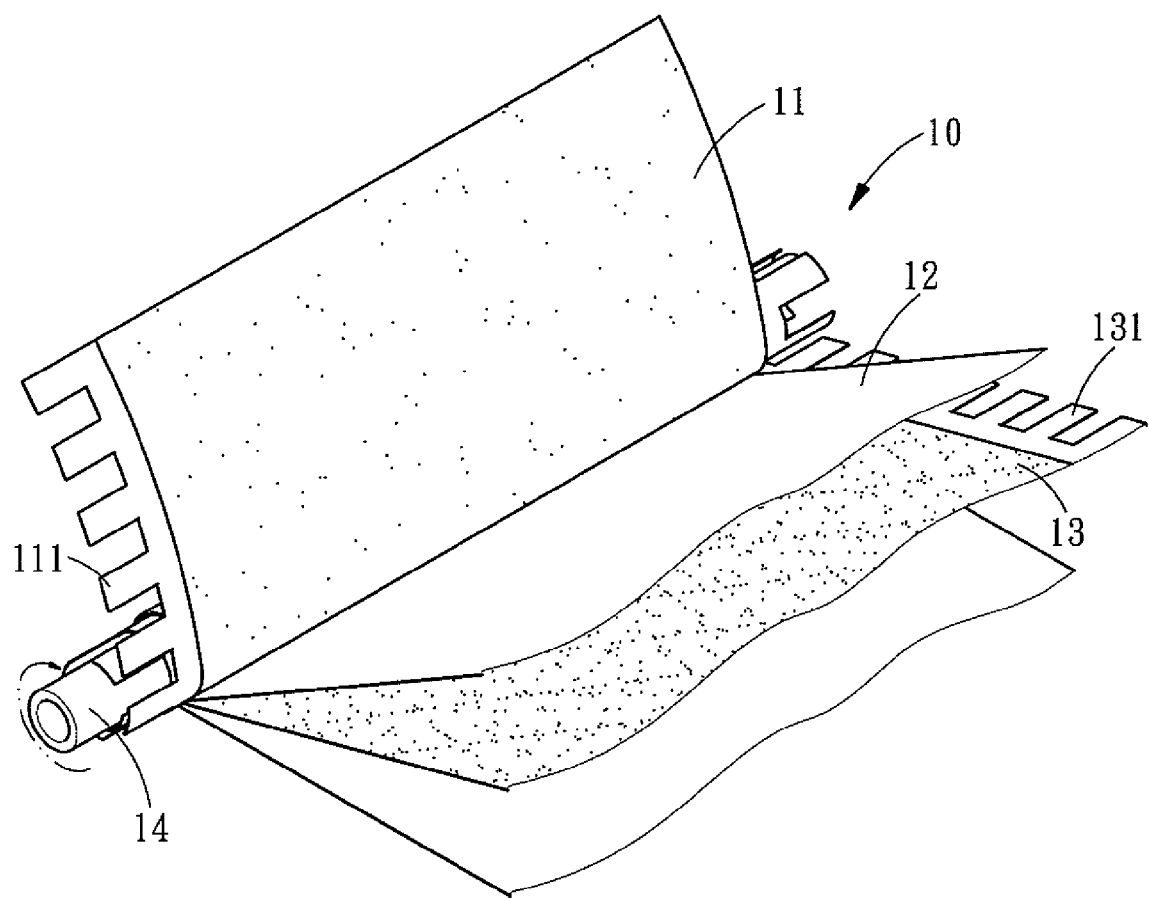
FIG. 1 is a perspective view of showing a conventional electrode assembly disclosed in U.S. Pat. No. 5,849,431.
Figure 2:
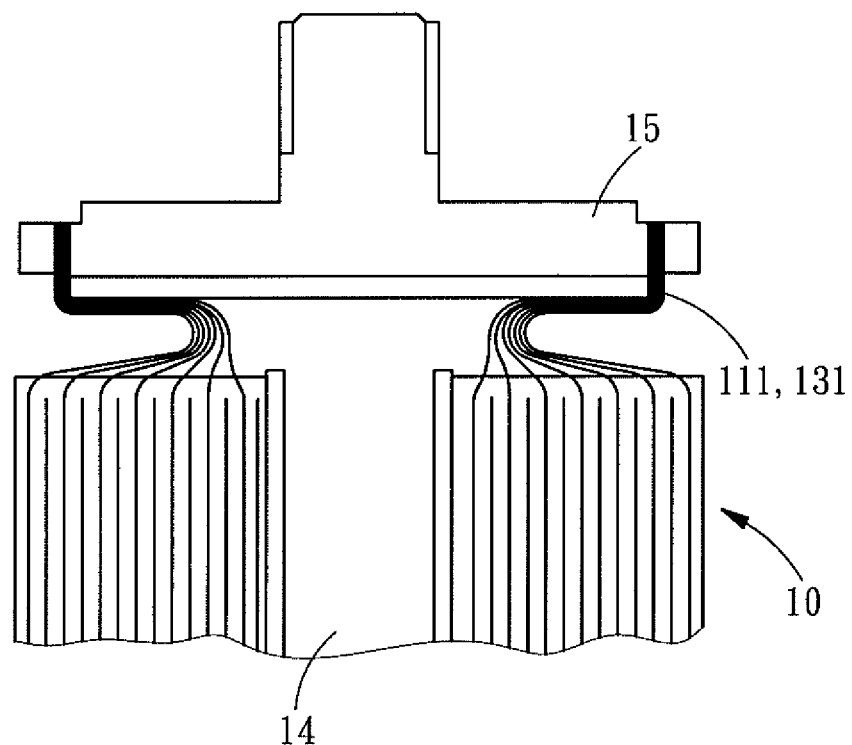
FIG. 2 is an illustrative view of showing the welding structure of the leads and the lead terminal of the conventional electrode assembly disclosed in U.S. Pat. No. 5,849,431.
Figure 3:
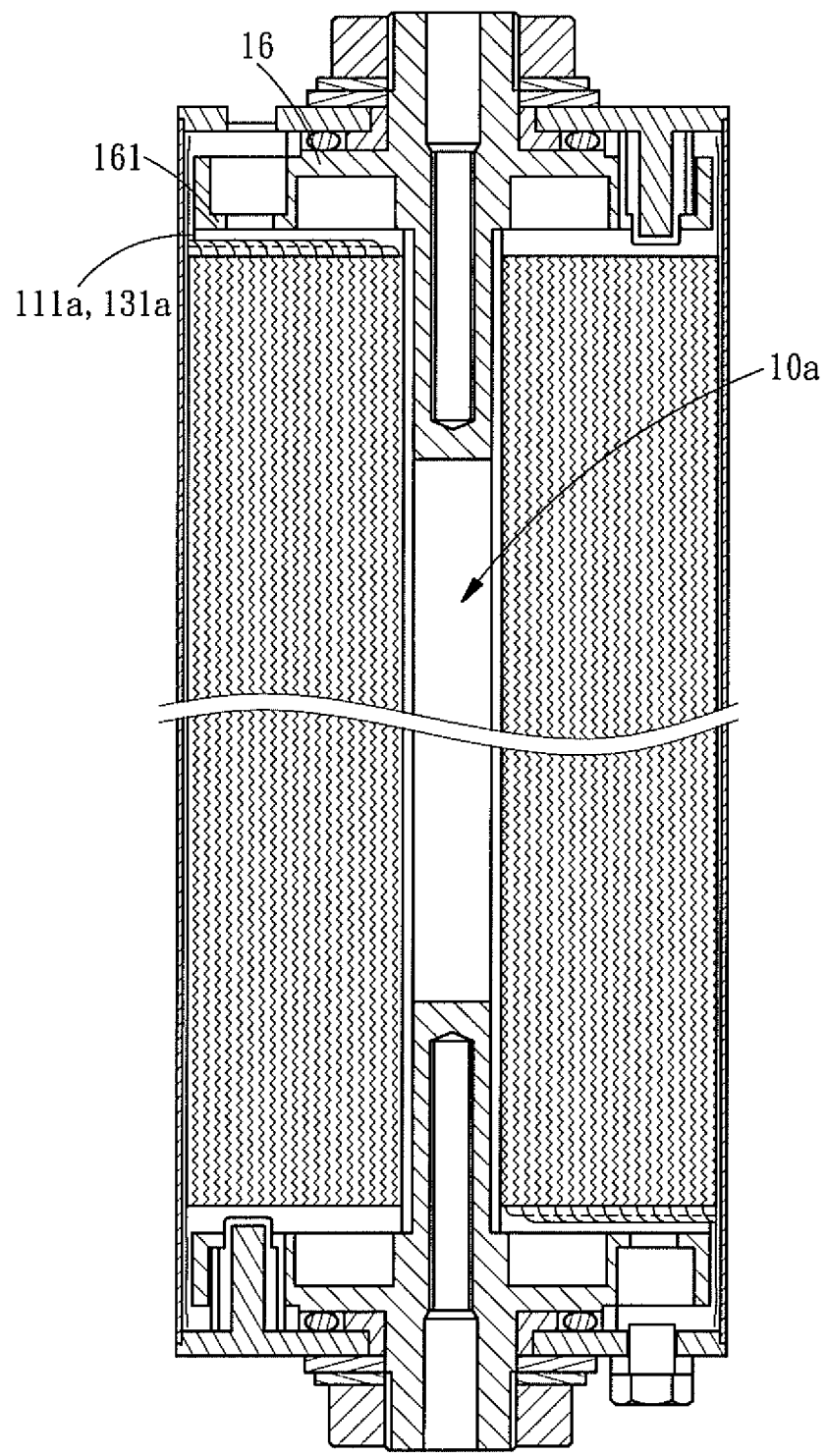
FIG. 3 is a cross sectional view of a lithium battery disclosed in U.S. Pat. No. 6,447,946.
Figure 4:
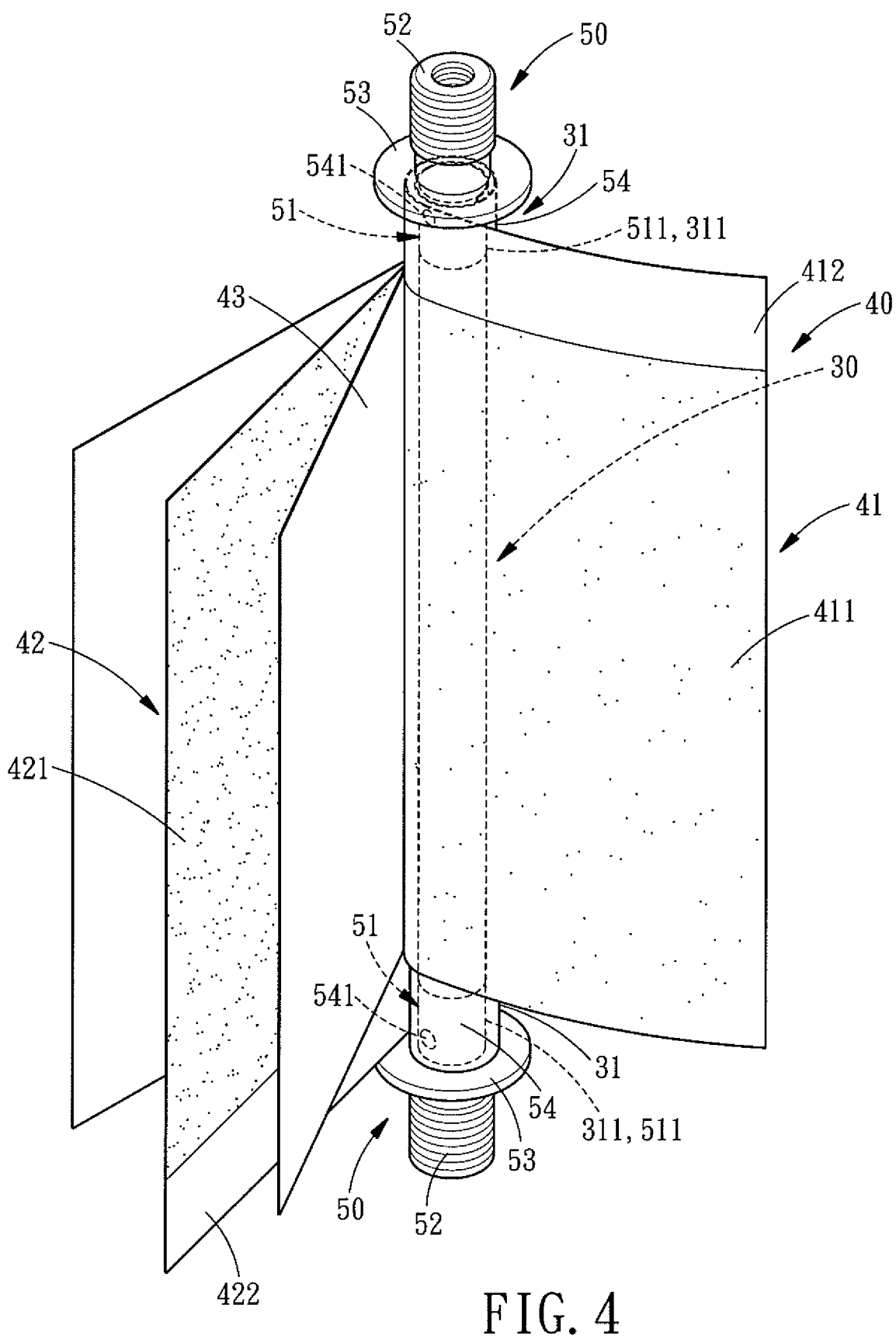
FIG. 4 is a perspective view of an electrode assembly in accordance with the present invention.

The present invention will be more clear from the following description when viewed together with the accompanying drawings, which show, for purpose of illustrations only, the preferred embodiment in accordance with the present invention.

Referring to FIGS. 4, 5, 6 and 7, a conductive structure for an electrode assembly of a lithium secondary battery in accordance with the present invention is shown and comprises a core disposed in a case, two lead terminals fixed at both ends of the core, an electrode assembly winding about the core, two clasping assemblies for enabling the ends of the electrode assembly to keep in electrical contact with the lead terminals, and two fixing nuts for fixing these internal components and the case.

The case 20 is formed in either end thereof with an opening 201 in which the components of the battery are to be received, and each of the openings 201 are sealed with a cap 21. A port 211 is formed in the cap 21 for passage of the components of the battery.

The core 30 is an insulating structure disposed in the case 20 and is formed at either end thereof with a connecting portion 31, and the connecting portion 31 can be an inserting groove 311.

The electrode assembly 40 includes a positive layer 41, a negative layer 42 and at least one separating layer 43. The surfaces of the positive and negative electrode layers 41, 42 are coated with positive electrode material 411 and negative electrode material 421, respectively. The separating layer 43 is located between the positive and negative electrode layers 41, 42. An uncoated area is formed at a side of the positive layer 41 for use as a positive lead area 412, and the negative layer 42 is formed at another side thereof opposite the positive layer 41 with an uncoated area for use as a negative lead area 422. The positive layer 41, the separating layer 43 and the negative layer 42 are superposed one upon another, and the positive and negative lead areas 412 and 422 protrude out of both sides of the assembly of positive layer 41, the separating layer 43 and the negative layer 42. After the electrode assembly 40 is formed by winding the positive layer 41, the separating layer 43 and the negative layer 42 about the core 30, both ends of the electrode assembly 40 will protrude out of the positive and negative lead areas 412 and 422.

Each of the lead terminals 50 is a conductive structure having a connecting end 51 formed at an end thereof. The connecting end 51 can be an inserting rod structure 511 to be connected to the connecting portion 31 of the core 30. Another end of the respective lead terminals 50 is formed with an output end 52 that can be a threaded rod structure. Each of the lead terminals 50 is particularly formed with a flange 53 and a collecting area 54 that are located between the connecting end 51 and the output end 52. The collecting area 54 can be a cylindrical structure formed with a through hole 541 and is located correspondingly to the positive lead area 412 or the negative lead area 422. The flange 53 abuts against the cap 21 of the case 20.

The clasping assembly 60 includes a screw rod 61 and two pressing pieces 62, 62a. The pressing pieces 62, 6a each is formed with a through hole 621 and is disposed outside the positive lead area 412 or the negative lead area 422. The screw rod is inserted through the through hole 621 of one of the pressing pieces 62, the through hole 541 of the collecting area 54, the through hole 621 of another one of the pressing pieces 62, and then is fixed thereto by a nut 63, so that the two pressing pieces 62 and 62a are firmly pressed against the positive lead area 412 or the negative lead area 422, and the positive lead area 412 or the negative lead area 422 are maintained in a close electrical contact with the collecting area 54.

When the electrode assembly 40, the core 30, and the lead terminals 50 are assembled together by the clasping assemblies 60, and the output end 52 of the lead terminals 50 passes through the port 211 of the cap 21 until the flange 53 is pressed against the inner surface of the cap 21, the fixing nuts 70 will be screwed to the output end 52, enabling the respective components of the battery to be assembled in the case 20 more stably.

The electrode assembly of the present invention has a large area that is in electrical contact with the lead terminals, so that the secondary battery has an excellent capability to charge and discharge large currents.

For a better understanding of the present invention, its operation and function, reference should be made to FIGS. 4-6 again. In order to have an excellent capability to charge and discharge large currents, the electrode assembly 40 and the lead terminals 50 are specially designed such that the positive and negative layers 41, 42 are formed at a side thereof with a large uncoated negative lead area 412 and a large uncoated positive lead area 422. In addition, the collecting area 54 is located correspondingly to the negative lead area 412 or the positive lead area 422. And then the clasping assemblies 60 are fixed outside the positive lead area 412 or the negative lead area 422. In this way, the two pressing pieces 62 and 62a are firmly pressed against the positive lead area 412 or the negative lead area 422. On the one hand, the respective layers of the positive lead area 412 or the negative lead area 422 are pressed closely against one another, and on the other hand, the innermost layer of the positive lead area 412 or the negative lead area 422 is allowed to be maintained in a tight electrical contact with the collecting area 54.

As mentioned above, the reason why the internal resistance of the battery of the present invention can be reduced is explained as follows:

Firstly, the positive and negative lead areas are integral with the electrode assembly. Electrically, the positive and negative lead areas are equivalent to numerous leads, which allow for smooth passage of large current, thus relatively reducing the internal resistance.

Secondly, the positive and negative lead areas are in electrical contact with the collecting area through a large area, which allow for smooth passage of large current, thus relatively reducing the internal resistance.

Thirdly, the clasping assembly makes the respective layers of the positive and negative lead areas press against one another closely, and the internal resistance can be effectively reduced once respective layers of the positive and negative lead areas are pressed against one another closely.

It is to be notated that the positive or negative lead area 412, 422 of the electrode assembly 40 is in direct electrical contact with the collecting area 54 of the lead terminals 50, without the use of conventional leads. Therefore, the manufacturing process of the battery is simplified without the need of welding the lead terminals 50 to the leads, thus substantially saving the manufacturing cost and the equipment cost.

When the structural design of the present invention is used in a high capacity battery, the large current generated during the charge and discharge of the electrode assembly can be transmitted through the large positive and negative lead areas and the large collecting area. Since the internal resistance decreases, the temperature of the electrode assembly is less likely to increase substantially during the charge and discharge process, thus making the service life of the secondary battery longer while making the operation of the battery more stable.

It is to be noted that in order to ensure the airtightness of the battery after the respective components of the battery are assembled in the case 20, particularly the airtightness between the case 20 and the lead terminals 50, a sealing washer 801 is arranged between the inner surface of the cap 21 and the flange 53, and another sealing washer 802 is provided between the fixing nut 70 and the outer surface of the cap 21. By tightening the fixing nut 70, the flange 53 and the port 211 of the cap 21 can be maintained in an airtight state.

Figure 5:
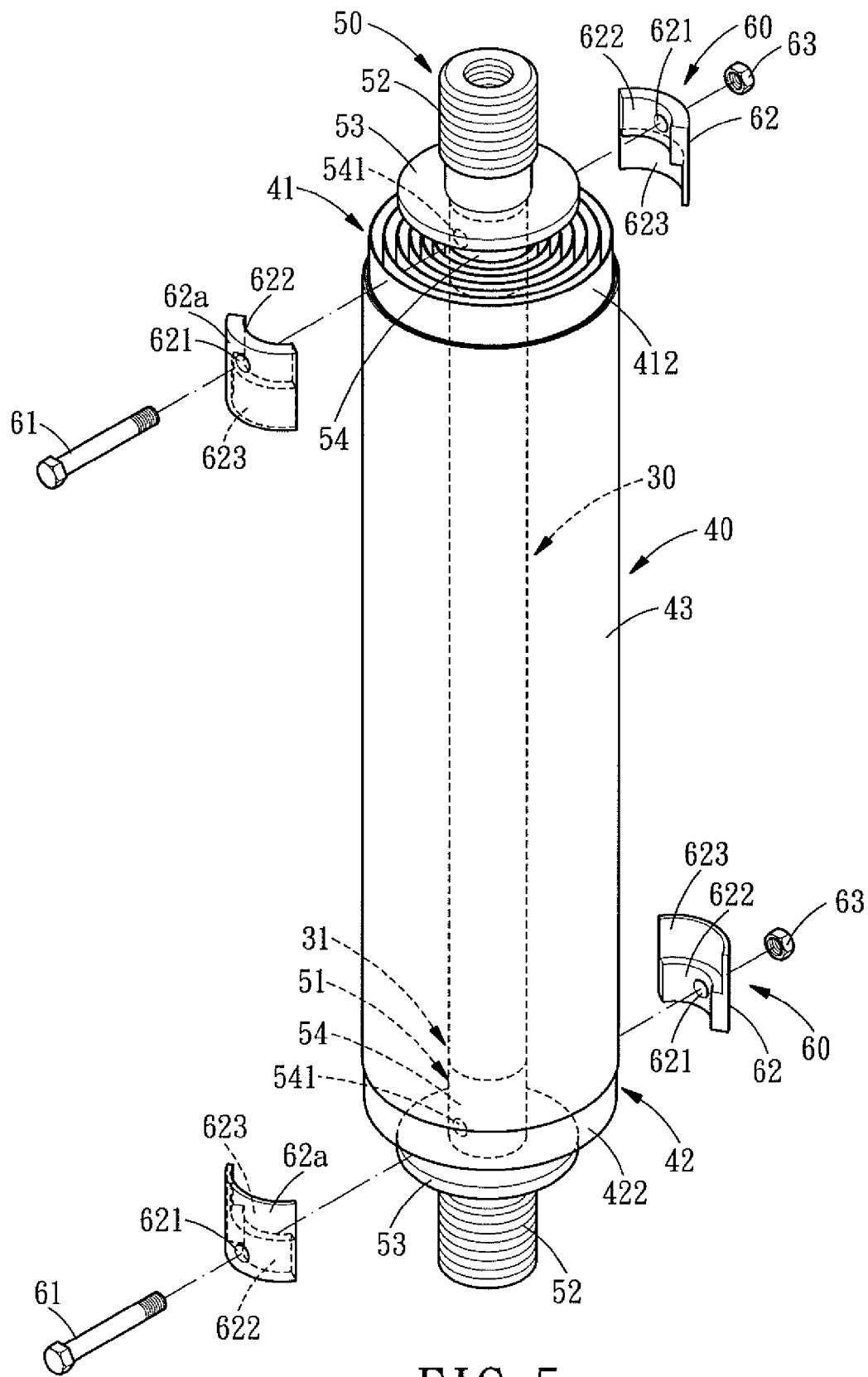
FIG. 5 is a perspective view in accordance with the present invention of showing the clasping assembly and the electrode assembly before they are assembled together.
Figure 6:
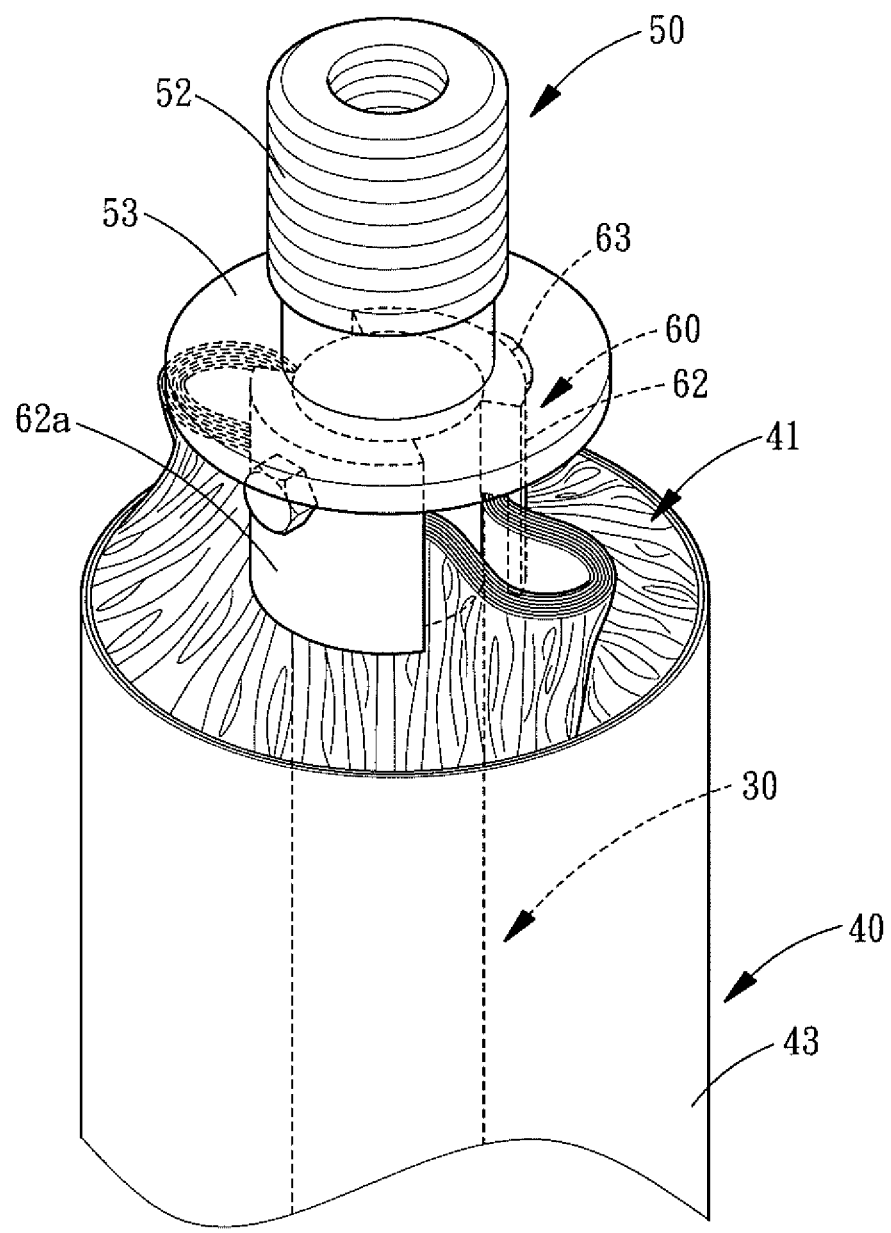
FIG. 6 is a partially amplified view in accordance with the present invention of showing the clasping assembly and the electrode assembly after they are assembled together.
Figure 7:
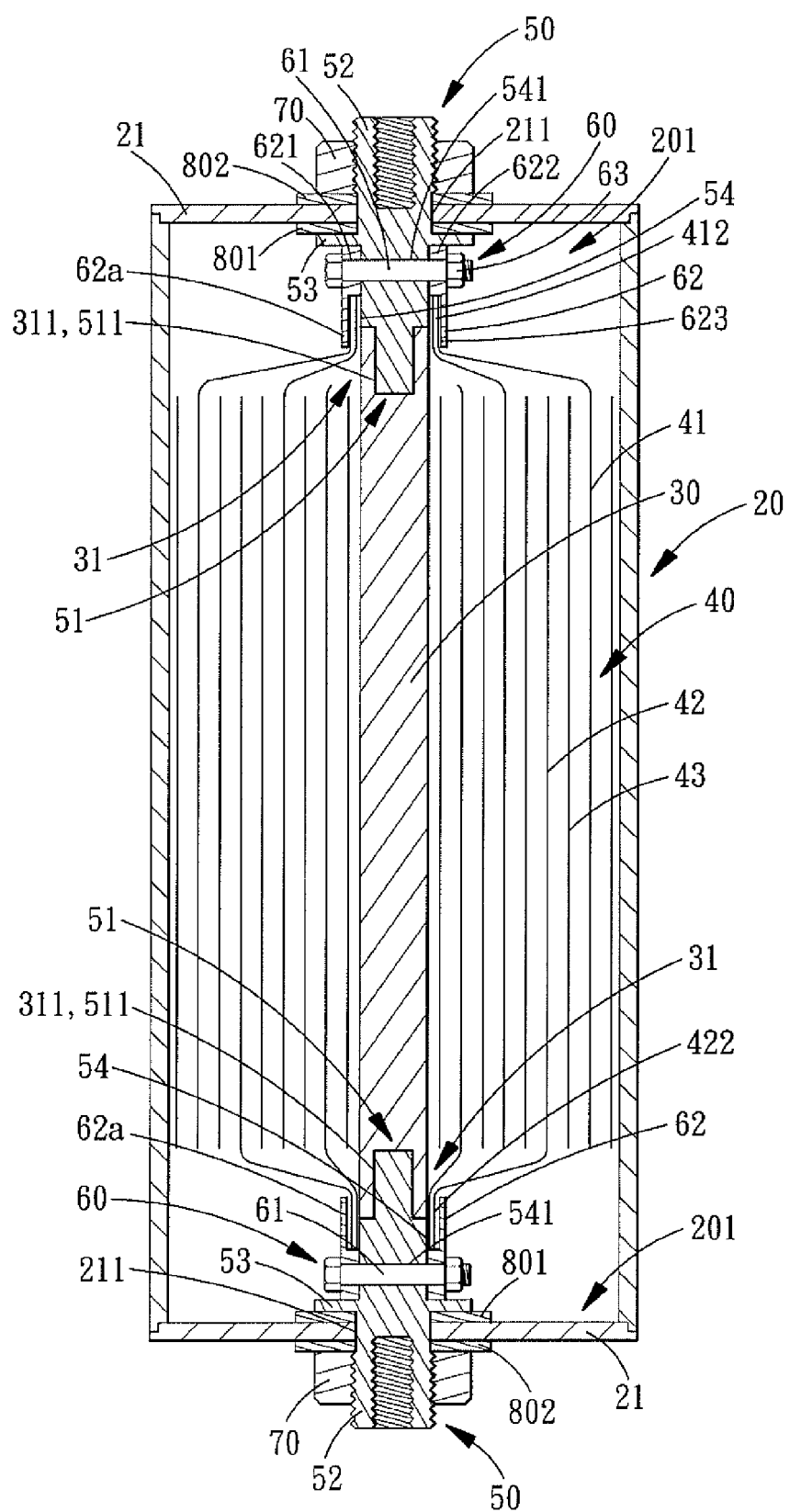
FIG. 7 is a cross sectional view in accordance with the present invention of showing the interior of the battery case.

Furthermore, as shown in FIGS. 5, 6 and 7, one surface of the pressing pieces 62 of the clasping assembly 60 can be an arc-shaped concave surface for mating with the cylindrical collecting area 54 in a convex and concave manner. This surface can be a stepped structure having a high portion 622 and a lower portion 623, so that after the lower portion 623 is pressed against the uncoated positive and negative lead areas 412 and 422, the coated area of the electrode assembly 40 will be flushed with the high portion 622. Otherwise, the pressing pieces 62 can't press closely against the surface of the electrode assembly since the coated and uncoated areas thereof are not in the same level.

Figure 8:
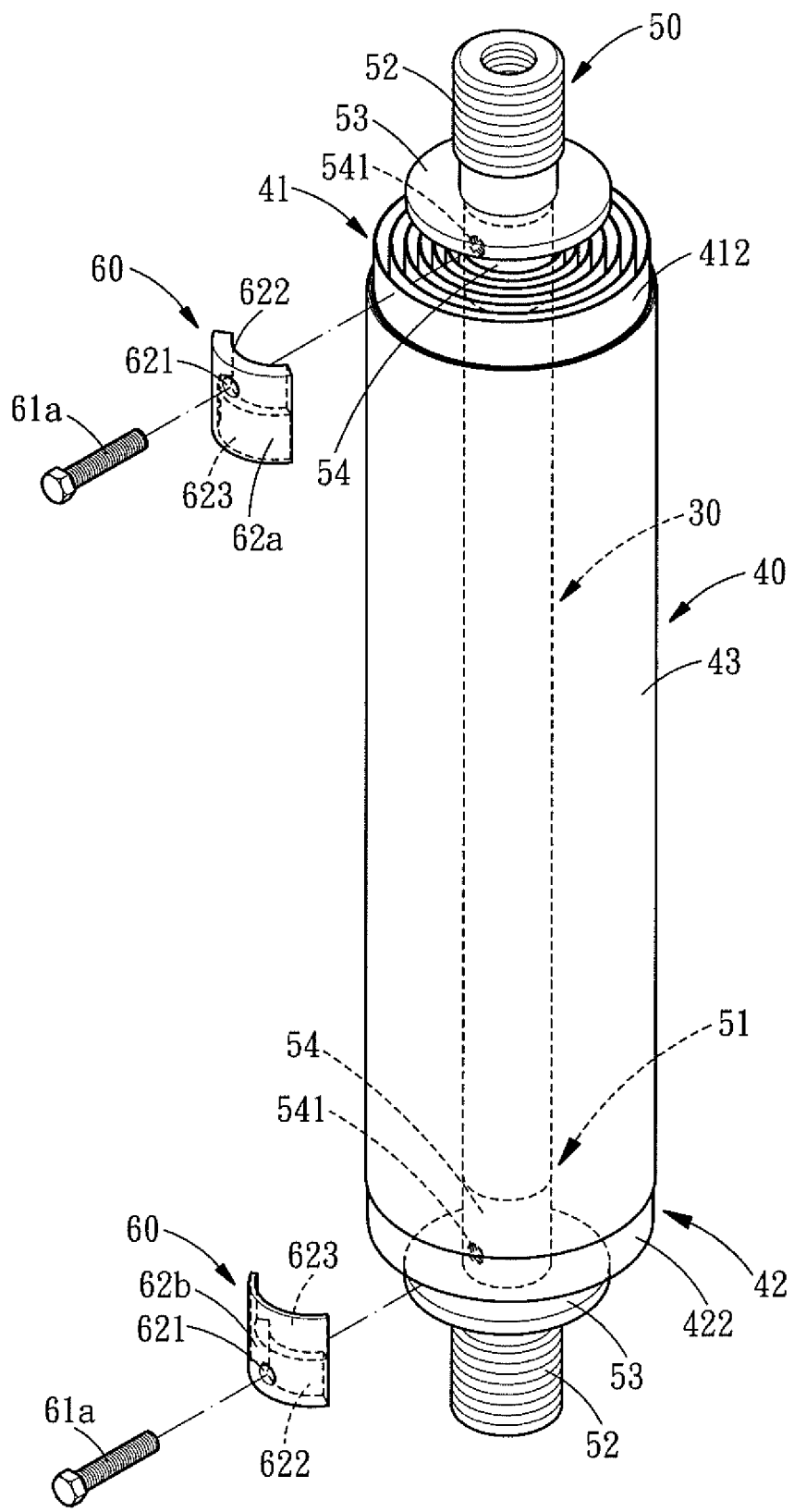
FIG. 8 is a perspective view in accordance with another embodiment of the present invention of showing a single-pressing-piece clasping assembly and the electrode assembly.
Figure 9:
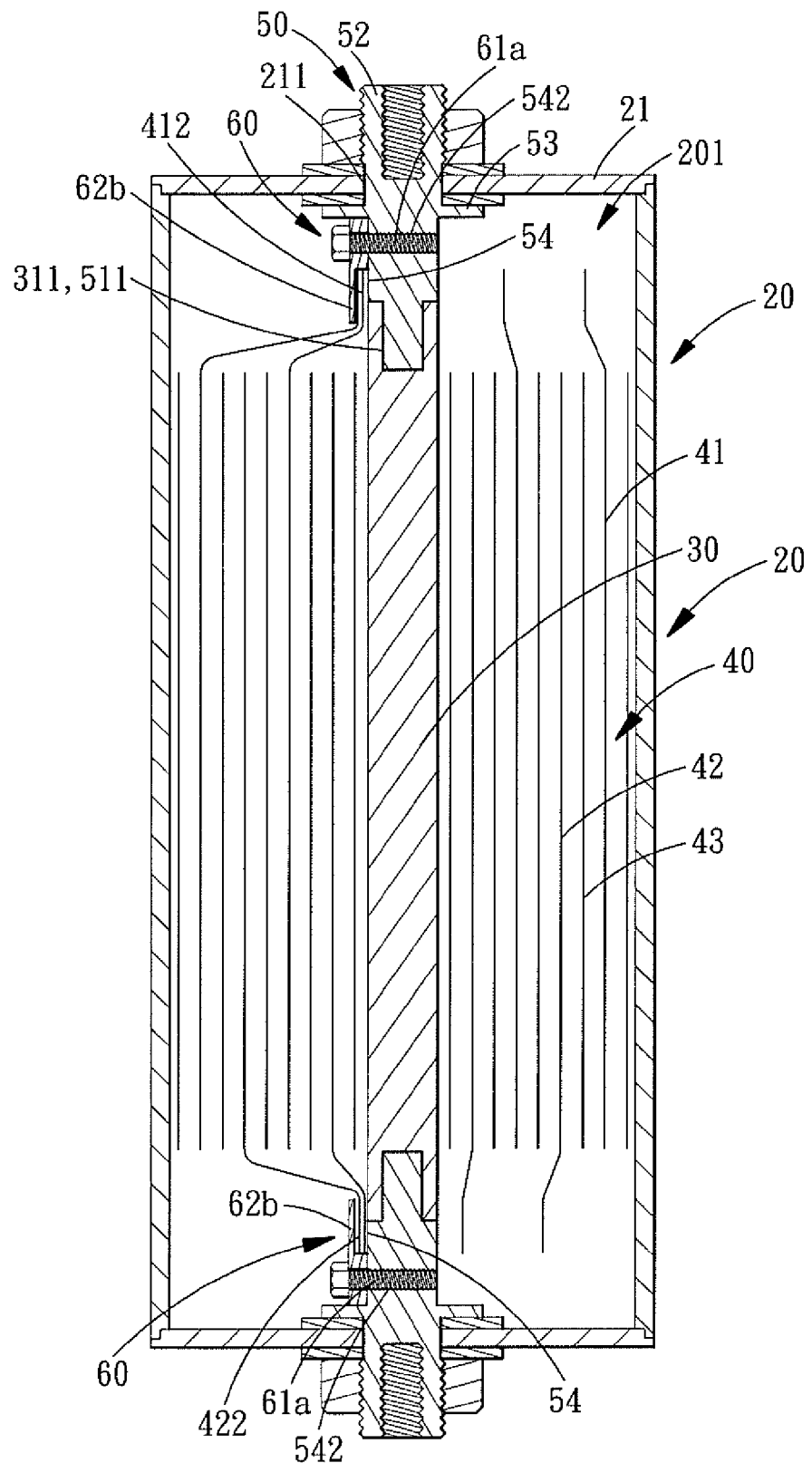
FIG. 9 is a cross sectional view in accordance with the another embodiment of the present invention of showing the interior of the battery case.

If the technology of the present invention is used in a small capacity battery, since the electrode assembly 40 of a small capacity battery has a relatively small number of layers and the battery case is also relatively narrow, as shown in FIGS. 8 and 9, the clasping assembly 60 can be changed to have a screw rod 61a and a single pressing piece 62b, namely, only one pressing piece 62b is disposed at a side of the outer surface of the positive and negative lead areas 412 and 422, and then the screw rod 61a passes through the pressing piece 62b and is screwed into the threaded hole 542 in the collecting area 54. In this way, the pressing piece 62b is pressed against a single side of the positive and negative lead areas 412 and 422 while making the single side of the positive and negative lead areas 412 and 422 have a close electrical contact with the collecting area 54.

While we have shown and described various embodiments in accordance with the present invention, it is clear to those skilled in the art that further embodiments may be made without departing from the scope of the present invention.

What is claimed is:

1. A lithium secondary battery comprising:
   a conductive structure comprising;
      a core disposed in a case,
      two lead terminals fixed at both ends of the core,
   an electrode assembly winding about the core,
   each lead terminal including a disk-shaped flange and a cylindrical-shaped collecting area extending downward from the flange to connect to the core,
   the electrode assembly including a positive layer with an uncoated positive lead area, a surface coated with positive electrode material, a negative layer with an uncoated negative lead area, a surface coated with negative electrode material, and at least one separating layer for separating the positive layer from the negative layer;
   characterized in that:
   a clasping assembly configured to enable the electrode assembly to keep in electrical contact with the lead terminals includes at least one screw rod, two pressing pieces, and two fixing nuts for fixing these components and the case;
   wherein the pressing pieces of the clasping assembling are arc-shaped for mating with the cylindrical-shaped collecting area, an inner surface of the pressing pieces of the clasping assembly is a stepped structure having a high portion and a lower portion, so that after the lower portion is pressed against the uncoated positive and negative lead areas, the coated area of the electrode assembly will be flushed with the high portion, and
   wherein the screw rod is inserted through a through hole of one of the pressing pieces, a through hole in the cylindrical-shaped collecting area, a through hole of the second pressing piece, and then is fixed thereto by one of the fixing nuts, so as to clamp the positive lead area or the negative lead area tightly against the cylindrical-shaped collecting area, and thus the positive lead area or the negative lead area are maintained in a tight electrical contact with the cylindrical-shaped collecting area.

\* \* \* \* \*